United States Patent [19]

Veronesi et al.

[11] Patent Number: 5,171,514
[45] Date of Patent: Dec. 15, 1992

[54] NOZZLE DAM HAVING A UNITARY PLUG

[75] Inventors: Luciano Veronesi, O'Hara Twp., Allegheny County; Robert M. Wepfer, Export, both of Pa.

[73] Assignee: Westinghouse Electric Corp., Pittsburgh, Pa.

[21] Appl. No.: 650,135

[22] Filed: Feb. 1, 1991

[51] Int. Cl.⁵ .............................................. G21C 13/06
[52] U.S. Cl. ...................................... 376/204; 138/89
[58] Field of Search ................... 138/89, 90; 376/203, 376/204; 220/238

[56] References Cited

U.S. PATENT DOCUMENTS

| | | | |
|---|---|---|---|
| 287,189 | 10/1883 | Stone | 220/238 |
| 2,010,200 | 8/1935 | Rufener et al. | 138/89 |
| 2,241,560 | 5/1941 | Schonler | 138/89 |
| 3,140,730 | 7/1964 | Costes | 138/89 |
| 4,077,840 | 3/1978 | Aubert . | |
| 4,079,701 | 3/1978 | Hickman et al. . | |
| 4,178,967 | 12/1979 | Streich | 138/89 |
| 4,519,519 | 5/1985 | Meuschke et al. | 376/204 |
| 4,548,783 | 10/1985 | Dalke et al. . | |
| 4,584,162 | 4/1986 | Yoli . | |
| 4,584,163 | 4/1986 | Hankinson . | |
| 4,591,068 | 5/1986 | Tolino et al. . | |
| 4,591,477 | 5/1986 | Rettew . | |
| 4,637,588 | 1/1987 | Wilhelm et al. . | |
| 4,671,326 | 6/1987 | Wilhelm et al. . | |
| 4,682,630 | 7/1987 | Schuker | 376/204 |
| 4,690,172 | 9/1987 | Everett . | |
| 4,693,278 | 9/1987 | Wilson et al. | 138/89 |
| 4,769,207 | 9/1988 | Weber et al. . | |
| 4,770,235 | 9/1988 | Rogers, Jr. et al. . | |
| 4,820,474 | 4/1989 | Leslie et al. . | |
| 4,954,312 | 9/1990 | McDonald et al. | 376/204 |
| 5,007,460 | 4/1991 | Zezza et al. | 376/204 |

FOREIGN PATENT DOCUMENTS

11179 of 1896 United Kingdom ................. 138/89

Primary Examiner—James E. Bryant, III
Attorney, Agent, or Firm—Walter S. Stevens

[57] ABSTRACT

Apparatus for sealing the primary-side coolant flow nozzles of a nuclear steam generator. The steam generator has relatively small diameter manway openings for providing access to the interior of the steam generator including the inside surface of each nozzle, the manway openings having a diameter substantially less than the inside diameter of each nozzle. The apparatus includes a bracket having an outside surface for matingly sealingly engaging the inside surface of the nozzle. The bracket also has a plurality of openings longitudinally therethrough and a plurality of slots transversely therein in communication with each opening. A plurality of unitary plugs sized to pass through the manway opening are matingly sealingly disposed in each opening of the bracket for sealingly plugging each opening. Each plug includes a plurality of arms operable to engage the slots of the bracket for connecting each plug to the bracket, so that the nozzle is sealed as the plugs seal the openings and are connected to the bracket.

20 Claims, 10 Drawing Sheets

NOZZLE DAM HAVING A UNITARY PLUG

This invention was conceived in the course of work performed under Contract No. DE-AC03-86SF16038 between the Westinghouse Electric Corporation and the U.S. Department of Energy. The Government may have rights in this patent application and any resulting patent.

BACKGROUND

This invention generally relates to apparatus for sealing conduits and more particularly relates to a nozzle dam having a unitary plug for sealing the primary nozzles of a nuclear steam generator.

Before discussing the current state of the art, it is instructive first to briefly describe the structure and operation of a typical nuclear steam generator. In this regard, a typical nuclear steam generator generally comprises a vertically oriented shell and a plurality of inverted U-shaped heat transfer tubes disposed in the shell. Pressurized radioactive primary fluid (e.g., water), which is heated by the core of a nuclear reactor, flows through the tubes as nonradioactive secondary fluid (i.e., water) of lower temperature circulates around the tubes. The steam generator further comprises a lower plenum defining an inlet plenum chamber and an outlet plenum chamber. A first leg of each inverted U-shaped heat transfer tube is in fluid communication with the inlet plenum chamber and the second leg of each inverted U-shaped heat transfer tube is in fluid communication with the outlet plenum chamber. Attached to the lower plenum and in fluid communication with the inlet plenum chamber is an inlet primary nozzle for delivering the primary fluid into the inlet plenum chamber. Moreover, attached to the lower plenum and in fluid communication with the outlet plenum chamber is an outlet primary nozzle for allowing the primary fluid to exit the outlet plenum chamber and thus exit the steam generator in the manner disclosed hereinbelow. In addition, the steam generator also includes a plurality of relatively small diameter manway openings in the lower plenum for allowing access to the inlet and outlet plenum chambers so that maintenance can be performed in the steam generator. In this typical nuclear steam generator, each manway opening has a diameter substantially less than the inside diameters of the inlet and outlet primary nozzles.

During operation of the steam generator, the primary fluid, which is heated by the nuclear reactor core, flows from the nuclear reactor core, through the inlet primary nozzle and into the inlet plenum chamber. The primary fluid then flows into the first leg of each heat transfer tube, out the second leg of each heat transfer tube and then into the outlet plenum chamber, whereupon it exits the outlet primary nozzle. Moreover, as the primary fluid exits the outlet primary nozzle, it is returned to the nuclear reactor core to be reheated. It will be appreciated that as the primary fluid flows through the heat transfer tubes, heat is transferred from the primary fluid to the secondary fluid for producing steam in a manner well known in the art of nuclear-powered electricity production. Such a nuclear steam generator is more fully disclosed in U.S. Pat. No. 4,079,701 entitled "Steam Generator Sludge Removal System" issued Mar. 21, 1978 to Robert A. Hickman et al.

Periodically, it is necessary to shut down the nuclear reactor core for refueling. At that time, it is also advantageous to perform maintenance on the steam generator. Such maintenance, for example, may be to plug and/or sleeve potentially degraded steam generator tubes or to decontaminate the steam generator. During maintenance activities, the reactor is partially drained of primary fluid to a level that is below the elevation of the inlet and outlet primary nozzles of the steam generator. However, it should be appreciated that the nuclear reactor should never be drained to a level that uncovers the reactor core. This process of partially draining the reactor also drains the heat transfer tubes and the inlet and outlet plenum chambers. After the heat transfer tubes and the inlet and outlet plenum chambers are drained of primary fluid, nozzle dams are inserted through the relatively small diameter manways and installed in the inlet and outlet primary nozzles to block the nozzles. Once these dams are in place, the nuclear reactor and the refueling cavity can then be refilled with primary fluid for the refueling operation, without interfering with maintenance activities being performed in the steam generator lower plenum because the nozzle dams prevent radioactive primary fluid from rising into the lower plenum of the steam generator. Also, once the nozzle dams are installed, the steam generator can be subjected to a chemical decontamination procedure without contaminating the nuclear reactor with contaminants removed during the decontamination of the steam generator because the inlet and outlet primary nozzles are blocked by the nozzle dams. Moreover, it is cost advantageous to simultaneously perform steam generator maintenance while the reactor core is being refueled rather than performing these activities in seriatim. This is true because it is necessary to shut down the reactor core during refueling or during steam generator maintenance. Of course, revenue-producing electricity is not generated while the reactor core is shut down. Each day the reactor core is shut down results in approximately $200,000 in lost revenue. Therefore, simultaneously performing reactor refueling and steam generator maintenance activities reduces the time the reactor core is shut down, thereby recapturing a portion of the approximately $200,000 each day in revenue that would otherwise be lost.

As stated hereinabove, the manway openings are typically substantially smaller than the inside diameter of the primary nozzles. Therefore, it has been necessary in the art to use foldable nozzle dams that can be folded to fit through the relatively small diameter manways and then unfolded to be disposed in the primary nozzles. The elastomeric seals of such nozzle dams are subjected to stresses, such as bending stresses, as the nozzle dams are folded and unfolded. Repeated folding and unfolding of the nozzle dam may increase the risk that the seals will loose their sealing ability over time after being subjected to these stresses as the nozzle dam is repeatedly folded and unfolded.

Steam generator nozzle dams are known. One such nozzle dam is disclosed in U.S. Pat. No. 4,637,588 entitled "Non-Bolted Ringless Nozzle Dam" issued Jan. 20, 1987 in the name of John J. Wilhelm et al. and assigned to the assignee of the present invention. This patent discloses a nozzle dam having one or more seal assemblies, each including a foldable circular seal plate encircled with an inflatable seal which is disposable in frictional engagement with the nozzle wall. It is a significant aspect of the Wilhelm et al. device that the seal plate be foldable because the nozzle dam must fit through the steam generator manway which has a diameter substantially less than that of the nozzle into which the nozzle dam will fit.

Another nozzle dam is disclosed in U.S. Pat. No. 4,671,326 entitled "Dual Seal Nozzle Dam and Alignment Means Therefor" issued Jun. 9, 1987 in the name of John J. Wilhelm et al. and assigned to the assignee of the present invention. This patent discloses a seal assembly including a foldable circular seal plate having a center section hingedly connected to two side sections. The seal plate is foldable for inserting the nozzle dam through the relatively small diameter steam generator manway. This patent also provides that a worker is present in the steam generator to unfold and insert the nozzle dam into the primary nozzle.

Therefore, a problem in the art has been to provide a nozzle dam that need not be folded and unfolded, so that the sealing ability of the seals attached to the nozzle dam are not compromised.

Another problem in the art has been to provide a nozzle dam having a unitary plug that is remotely installable so that maintenance personnel need not be present in the radioactive environment of the steam generator to manually insert the nozzle dam in the primary nozzles.

Thus, although the above recited patents may disclose nozzle dam devices, these patents do not appear to disclose a nozzle dam having a unitary plug capable of being remotely inserted through a relatively small diameter steam generator manway without the necessity of the nozzle dam and plug being foldable and unfoldable.

Therefore, what is needed is a nozzle dam having a unitary plug for sealing the primary nozzles of a nuclear steam generator, the unitary plug capable of being remotely inserted through a relatively small diameter steam generator manway without the necessity of the nozzle dam and plug being foldable and unfoldable in order to insert it through the manway opening.

SUMMARY

Disclosed herein is a nozzle dam having a unitary plug for sealing the primary nozzles of a nuclear steam generator. In the preferred embodiment, the nozzle dam includes a bracket having an outside surface for matingly engaging the inside surface of the nozzle. The bracket, which preferably will have been previously attached to the inside surface of the nozzle, such as during manufacture of the steam generator, also has a plurality of openings longitudinally therethrough and a plurality of slots transversely therein in communication with each opening. A unitary plug is associated with each opening of the bracket and is matingly disposed in each associated opening for sealably plugging each opening.

Each plug includes a plurality of slidable elongated arms operable to engage the slots of the bracket for connecting the plug to the bracket. The plug further includes a first plate disposed in each opening of the bracket, the first plate having a threaded longitudinal first bore and a plurality of substantially smooth transverse channels therethrough, each channel capable of matingly slidably receiving an associated arm belonging to each plug. The plug also includes a second plate mounted on the top surface of the bracket and disposed coaxially adjacent the first plate. The second plate has a threaded second bore longitudinally therethrough. A rotatable threaded shaft extends through the threaded bores of the first and second plates for connecting the first and second plates together. More specifically, the shaft has a first threaded portion for threadably engaging the threaded first bore of the first plate and a second threaded portion for threadably engaging the threaded second bore of the second plate. The shaft also has a third threaded portion intermediate the first threaded portion and the second threaded portion of the shaft. The threads of the first bore of the first plate are "finer" than the threads of the second bore of the second plate, so that the first and second plates move as the shaft is turned. That is, the threads of the first threaded portion and the second threaded portion are in the same direction but have a different pitch, so that as the shaft is rotated the first plate and the second plate move closer together or further apart, depending on the direction of rotation of the shaft. The threads of the third threaded portion of the shaft are disposed in a direction opposite that of the first threaded portion and the second threaded portion of the shaft for reasons provided immediately hereinbelow.

The plug also includes a wing nut having a threaded bore longitudinally therethrough for threadably engaging the third threaded portion of the shaft. The wing nut also has a hole of a predetermined contour transversely therethrough defining a cam surface. Each of the slidable arms is slidably disposed in each associated channel of the first plate, each arm having a first end portion and a second end portion, the second end portion sized to engage the transverse slot of the bracket. A rounded cam is integrally attached to the first end portion of the arm for slidably engaging the contour of the cam surface defined by the hole of the wing nut. As the shaft is rotated, the wing nut threadably traverses along the shaft because the threads of the third threaded portion of the shaft are oppositely disposed with respect to the threads of the first and second threaded portions of the shaft. As the wing nut threadably traverses along the shaft, the contoured cam surface of the wing nut slidably engages the cam, thus causing the arm to slide in the channel because the cam is attached to the arm. As the arm slides in the channel, the second end portion of each arm slidably engages its associated slot for connecting the plug to the bracket.

An object of the present invention is to provide a remotely installable apparatus for sealing a conduit, such as the primary nozzles of a nuclear steam generator.

Another object of the present invention is to provide a nozzle dam having a unitary plug that need not be folded and unfolded in order to pass it through the relatively small diameter manway of the nuclear steam generator.

A feature of the present invention is that the unitary plug is sized to pass through the relatively small diameter manway of the nuclear steam generator.

Another feature of the present invention is the provision of a seal attached to the plug in such a manner that the seal is not subjected to substantial stresses, such as bending stresses.

An advantage of the present invention is that it is not necessary to fold or to disassemble the plug in order to pass the plug through the relatively small diameter manway and thereafter dispose personnel in the radioactive environment of the steam generator to unfold or reassemble the plug to install the plug in the primary nozzle.

Another advantage of the present invention is that, because of its unitary construction, the plug belonging to the nozzle dam is easily remotely installable in the primary nozzle of the steam generator, thus eliminating the radiation dose to maintenance personnel otherwise required to enter the steam generator to unfold or reassemble the plug in order to install the plug in the primary nozzle.

BRIEF DESCRIPTION OF THE DRAWINGS

While the specification concludes with claims particularly pointing out and distinctly claiming the subject matter of the invention, it is believed the invention will be better understood from the following description take in conjunction with the accompanying drawings, wherein:

DESCRIPTION OF THE PREFERRED EMBODIMENT(S)

A nuclear power plant includes a nuclear reactor for producing heat and a steam generator in heat transfer communication with the nuclear reactor for generating steam. The steam generator includes inlet and outlet primary nozzles attached to the steam generator. At times it is necessary to perform maintenance in the steam generator. To safely and satisfactorily perform this maintenance, it is prudent first to sealingly block the inlet and outlet primary nozzles of the steam generator. Disclosed herein is a nozzle dam having a unitary plug for sealingly blocking the inlet and outlet primary nozzles of the steam generator so that maintenance activities can be safely and satisfactorily performed in the steam generator.

Before describing the subject matter of the present invention, it is instructive first to generally describe the structure and operation of a typical nuclear reactor and associated steam generator.

Figure 1:
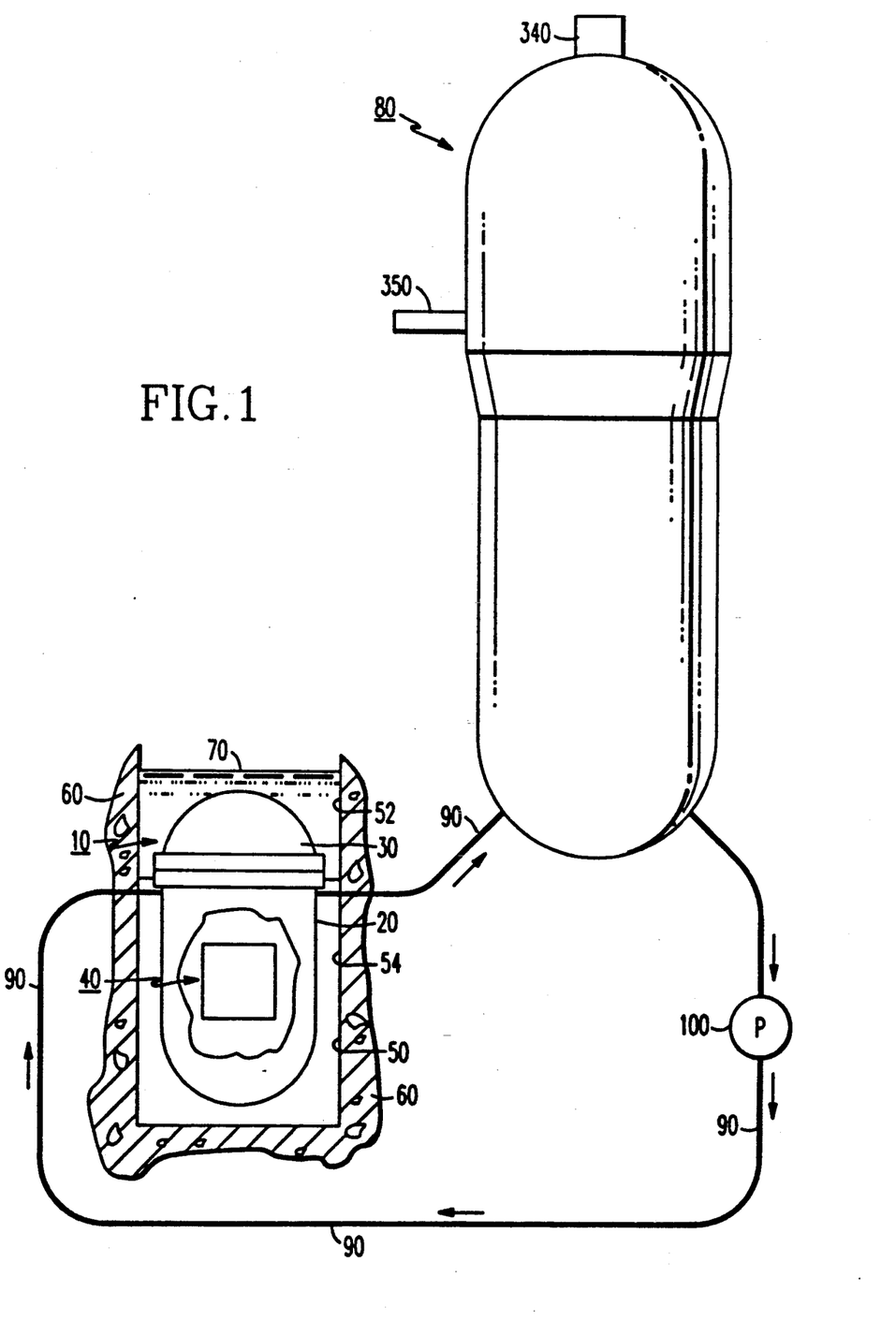
FIG. 1 illustrates a nuclear reactor connected to a steam generator.

Therefore, referring to FIG. 1, there is illustrated a nuclear reactor vessel, generally referred to as 10, having a lower portion 20 and a closure head 30 mounted atop lower portion 20. Lower portion 20 of reactor vessel 10 houses a nuclear reactor core, generally referred to as 40, for producing heat. Reactor vessel 10 is disposed in a reactor cavity 50 defined by a reactor vessel enclosure 60. Reactor cavity 50 is partitioned into an upper cavity portion 52 sealingly isolated from a lower cavity portion 54. Moreover, reactor core 40 is surrounded by a radioactive primary fluid (e.g., demineralized water) for removing the heat produced by reactor core 40 and for moderating neutrons produced by reactor core 40 so that the fissioning process of nuclear fuel contained in reactor core 40 is enhanced. In addition, the closure head 30 is surrounded by a refueling pool 70 (e.g., demineralized water) substantially filling upper cavity portion 52 for providing a biological shield during refueling operations so that nuclear radiation from reactor core 40 is attenuated during refueling of reactor core 40. Of course, before refueling operations commence, closure head 30 is removed from lower portion 20 in a manner well known in the art to provide access to reactor core 40.

Still referring to FIG. 1, a steam generator, generally referred to as 80 is disposed near reactor vessel 10 for producing steam, as described more fully hereinbelow. Interconnecting reactor vessel 10 and steam generator 80 is a conduit or pipe 90 that is in fluid communication with the primary fluid surrounding reactor core 40 and through which conduit 90 the primary fluid flows. In fluid communication with conduit 90 is a reactor coolant pump 100 for pumping the primary fluid through conduit 90, through reactor core 40 and through the primary side of steam generator 80.

Referring again to FIG. 1, as coolant pump 100 operates, the primary fluid circulates through reactor vessel 10 and then flows from reactor vessel 10 through a portion of conduit 90 and into steam generator 80, wherein the heat of the primary fluid is removed for producing steam in the manner described hereinbelow. The primary fluid then exits steam generator 80 and flows through pump 100 and through the remaining portion of conduit 90 to return to reactor core 40 which is housed in reactor vessel 10. In this manner, the primary fluid continuously circulates through the closed loop defined by reactor vessel 10, steam generator 80 and conduit 90. The path of primary coolant flow is generally illustrated by the arrows shown in FIG. 1.

Figure 2:
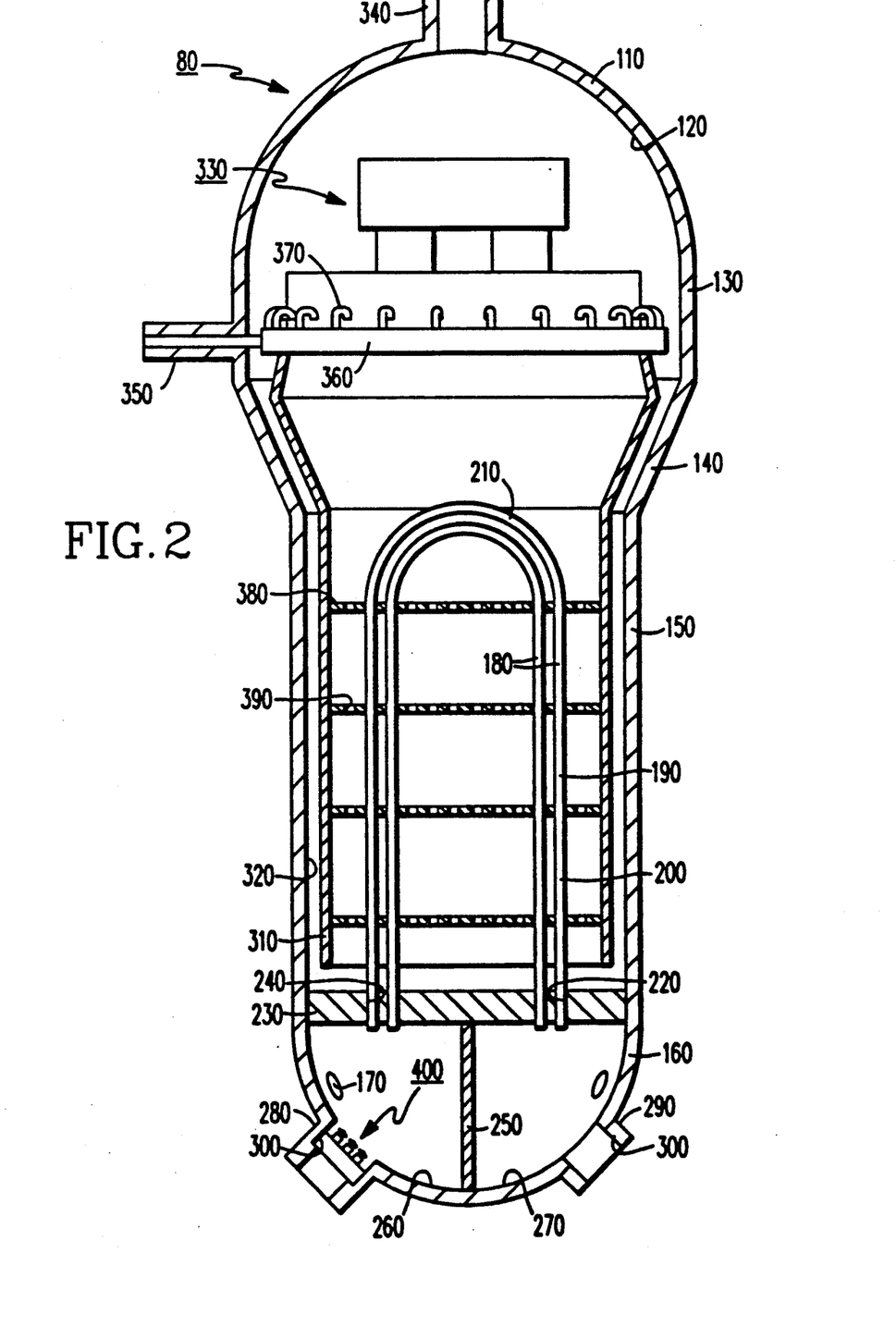
FIG. 2 is a view in partial vertical section of the steam generator with parts removed for clarity, the steam generator having an inlet primary nozzle and an outlet primary nozzle in fluid communication with a lower plenum of the steam generator.
Figure 3:
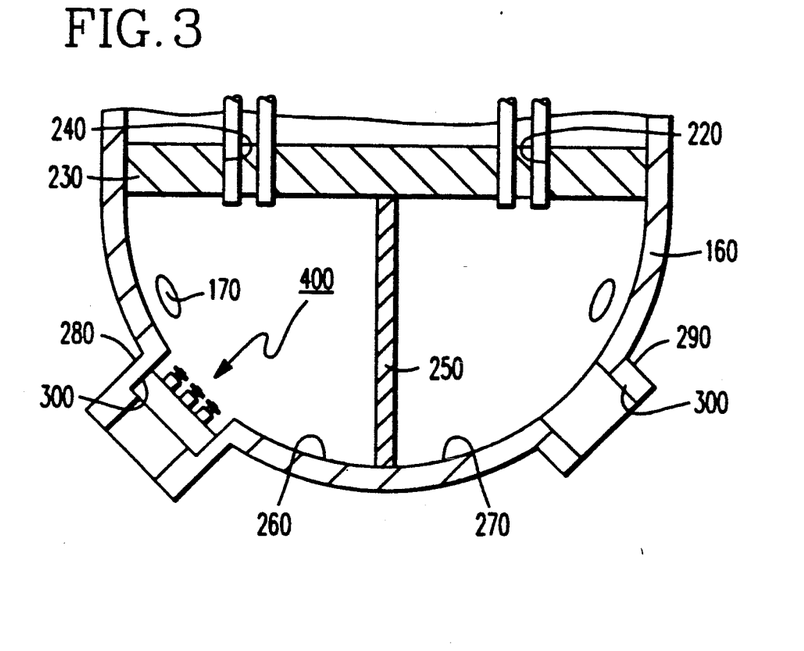
FIG. 3 is a fragmentation view in vertical section of the lower plenum of the steam generator showing a nozzle dam of the present invention installed in the inlet primary nozzle.
Figure 4:
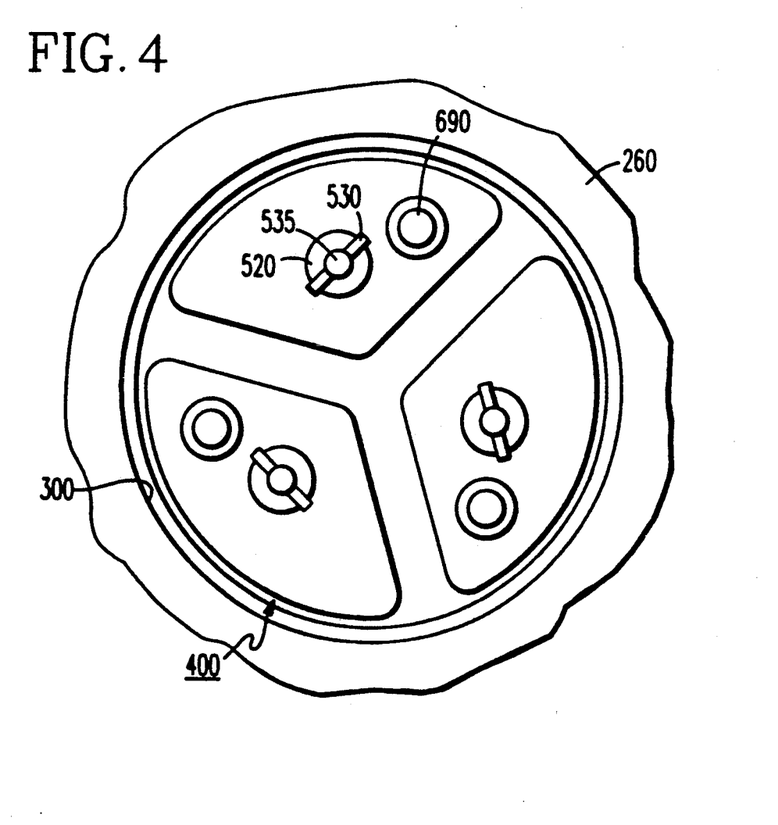
FIG. 4 is a plan view of the nozzle dam.
Figure 5:
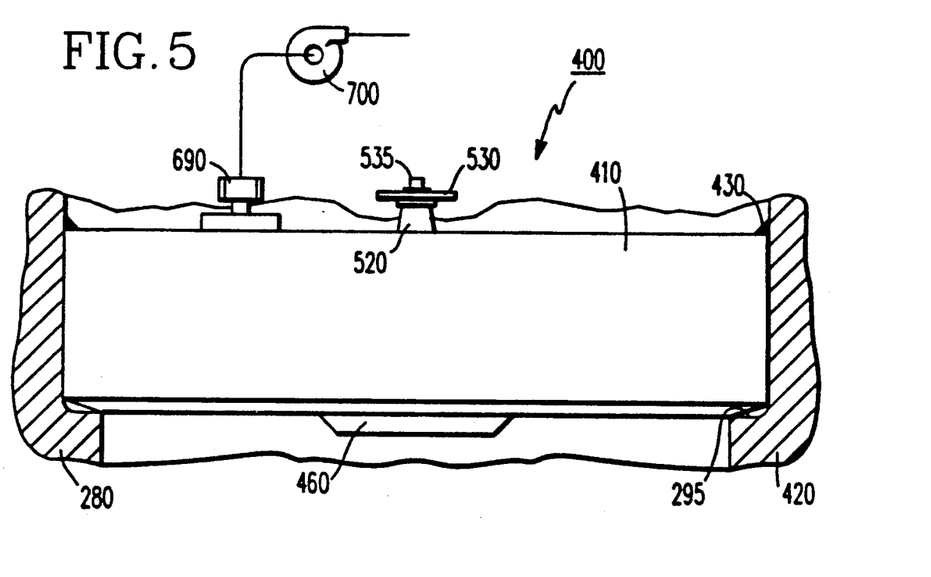
FIG. 5 is a lateral view of the nozzle dam.
Figure 6:
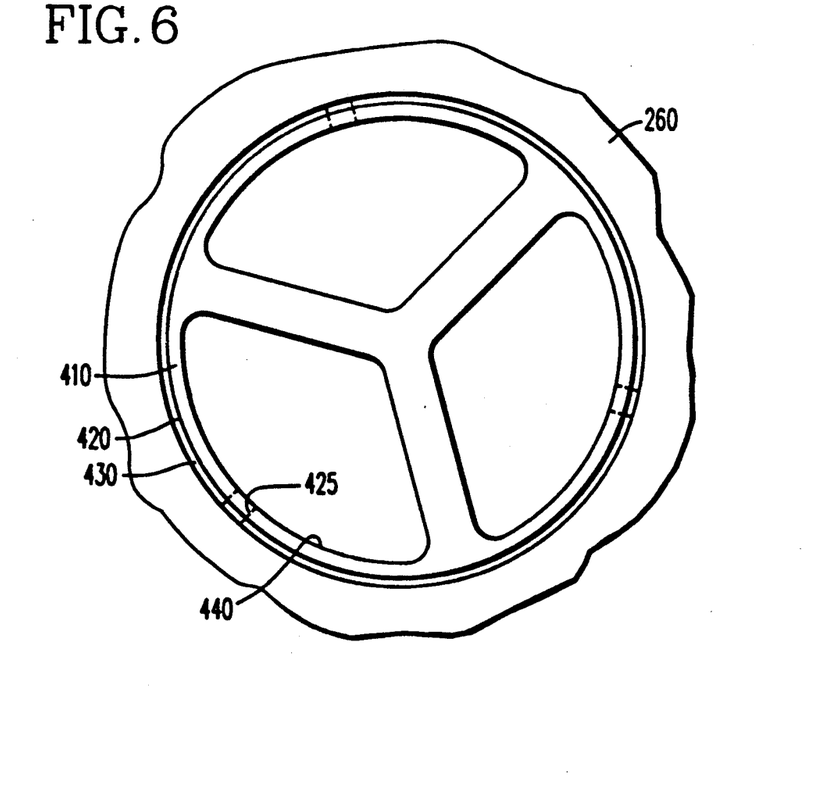
FIG. 6 is a plan view of a bracket belonging to the nozzle dam.

Turning now to FIG. 2, there is shown steam generator 80 with parts removed for clarity. Steam generator 80 comprises a vertically-oriented shell 110 defining a cavity 120 therein. Shell 110 has a dome-shaped upper shell portion 130, a frusto-conical transition portion 140 integrally attached to upper shell portion 130, a cylindrical hull portion 150 integrally attached to transition portion 140, and a bowl-shaped lower shell portion or channel head 160 integrally attached to hull portion 150. Formed through lower shell portion 160 are a plurality of relatively small diameter manway openings 170 (only two of which are shown) for reasons provided hereinbelow. Of course, manway openings 170 are capable of being sealingly covered by suitable manway covers (not shown) during operation of steam generator 80.

Still referring to FIG. 2, disposed in cavity 120 are a plurality of inverted vertically-oriented U-shaped steam generator tubes 180 for conducting the radioactive primary fluid therethrough, the plurality of tubes 180 defining a tube bundle 190. Moreover, as shown in FIG. 2, each U-shaped tube 180 has a pair of vertical tube leg portions 200 interconnected by a U-bend tube portion 210 integrally formed therewith. In addition, each tube leg portion 200 has an open tube end 220 for passage of the primary fluid therethrough. Disposed in cavity 120 near lower shell portion 160 is a horizontal tube sheet 230 having a plurality of apertures 240 therethrough for receiving and for vertically supporting each tube end 220, which tube ends 220 are suitably attached to tube sheet 230, such as by welding.

Referring again to FIG. 2, disposed in lower shell portion 160 is a vertical divider plate 250 for dividing lower shell portion 160 into an inlet plenum chamber 260 and an outlet plenum chamber 270. It will be appreciated that manway openings 170 allow access to inlet plenum chamber 260 and outlet plenum chamber 270, so that maintenance can be performed in steam generator 80. Such maintenance may be to plug and/or sleeve any degraded tubes 180 or to decontaminate steam generator 80. Integrally attached to lower shell portion 160 is an inlet primary nozzle 280 and an outlet primary nozzle 290 in fluid communication with inlet plenum chamber 260 and outlet plenum chamber 270, respectively. Each of the nozzles 280 and 290 has a circumferential inside surface 300 which may define an annular depending shoulder 295 therearound. Disposed in cavity 120 above tube sheet 230 and interposed between shell 110 and tube bundle 190 is a cylindrical wrapper sheet 310 defining an annular downcomer region 320 between shell 210 and wrapper sheet 310. Wrapper sheet 310 is open at its bottom end and partially closed at its top end. That is, formed through the top end of wrapper sheet 310 are a plurality of holes (not shown) in its top end for passage of a steam-water mixture therethrough. Mounted atop wrapper sheet 310 is a moisture separator assembly, generally referred to as 330, for separating the steam-water mixture into liquid water and relatively dry saturated steam. Moisture separator assembly 330 also has holes (not shown) in the bottom portion thereof for receipt of the steam-water mixture from the interior of wrapper sheet 310 and holes (not shown) in the top portion thereof for passage of the dry saturated steam flowing upwardly through moisture separator assembly 330. In addition, integrally attached to the top of upper shell portion 130 is a main steam line nozzle 340 for passage of the dry saturated steam therethrough after the dry saturated steam is separated from the steam-water mixture and passes upwardly from moisture separator assembly 330.

As shown in FIG. 2, integrally attached to upper shell portion 130 is a feedwater nozzle 350 for passage of nonradioactive feedwater (i.e., secondary fluid) into a toroidal feedring 360 which is in fluid communication with feedwater nozzle 350. Feedring 360 surrounds wrapper sheet 310 at the upper portion of wrapper sheet 310 and has a plurality of nozzles 370 attached thereto for passage of the feedwater from feedring 370 downwardly into downcomer region 320. Disposed inwardly of wrapper sheet 310 are a plurality of horizontal spaced-apart tube support plates 380 (only four of which are shown) having holes 390 therethrough for receiving each tube 180 so that each tube 180 is laterally supported thereby. Each support plate 380 also has a plurality of additional holes for passage of the nonradioactive secondary fluid upwardly therethrough. It will be appreciated that primary nozzles 280/290, inlet plenum chamber 260, the interior of tubes 180 and outlet plenum chamber 270 together define the primary side of steam generator 80. It will be further appreciated that the portion of cavity 120 above tube sheet 230 and externally of tubes 80 defines the secondary side of steam generator 80.

During operation of steam generator 80, the primary fluid, which is heated by reactor core 40, flows through the primary side of steam generator 80. In this regard, the primary fluid flows from reactor core 40 through conduit 90, through inlet nozzle 280 (which is connected to conduit 90) and into inlet plenum chamber 260. The primary fluid then travels through the open tube ends 220 that are in fluid communication with inlet plenum chamber 260, through tubes 180, out the other open tube end 220 and into outlet plenum chamber 270, whereupon the primary fluid exits steam generator 80 through outlet nozzle 290 and is returned by conduit 90 to reactor core 40. As the primary fluid flows through the primary side of steam generator 80, secondary fluid flows through the secondary side of steam generator 80. That is, as the primary fluid flows through tubes 180, feedwater (i.e., the secondary fluid) simultaneously enters steam generator 80 through feedwater nozzle 350, flows through nozzles 370 and then flows downwardly through downcomer region 320 until the feedwater impinges tube sheet 230. The feedwater then turns upwardly to surround tube bundle 190. As the primary fluid flows through tubes 180 it gives up its heat to the secondary feedwater fluid surrounding tube bundle 190. A portion of the secondary fluid surrounding tube bundle 190 is converted into a steam-water mixture that flows upwardly to moisture separator assembly 330 which separates the steam-water mixture into liquid water and relatively dry saturated steam. The liquid water returns downwardly to bundle 190 (i.e., the plurality of tubes 180) as the dry saturated steam continues upwardly to exit steam generator 80. The dry saturated steam exits steam generator 80 through main steam line nozzle 340 and is transported to a turbine-generator (not shown) for producing electricity in a manner well known in the art of nuclear-powered electricity production. Such a steam generator is disclosed in U.S. Pat. No. 4,079,701 entitled "Steam Generator Sludge Removal System" issued Mar. 21, 1978 to Robert A. Hickman et al., the disclosure of which is hereby incorporated by reference.

Referring to FIGS. 2, 3, 4, and 5, a nozzle dam, generally referred to as 400, is disposed in primary inlet nozzle 280 for sealingly blocking primary inlet nozzle 280 so that maintenance can be safely and suitably performed in inlet plenum chamber 260. Of course, it will be appreciated that nozzle dam 400 may also be disposed in primary outlet nozzle 290 for blocking outlet nozzle 290 so that maintenance can be safely and suitably performed in outlet plenum chamber 270. However, for the sake of conciseness, the description of the invention herein will be made primarily with reference to blocking primary inlet nozzle 280. Moreover, it will be understood that nozzle dam 400 may also be disposed in conduit 90 for sealingly blocking conduit 90, if desired. For reasons provided immediately hereinbelow, it is important that nozzle dam 400 suitable block inlet nozzle 260 during steam generator maintenance activities. Because the elevation of refueling pool 70 is typically above the elevation of inlet nozzle 280 during refueling, the hydraulic head experienced by the primary fluid in conduit 90 would force the primary fluid through inlet nozzle 280 and into inlet plenum chamber 260, if primary nozzle 280 were not blocked. Primary fluid in inlet plenum chamber 260 will interfere with maintenance activities being performed in inlet plenum chamber 260. Therefore, according to the present invention, nozzle dam 400 prevents the primary fluid from entering inlet plenum chamber 260 while steam generator 80 is being serviced.

Referring to FIGS. 6, 7, 8, and 9, nozzle dam 400 is there shown disposed in inlet nozzle 280 for sealingly blocking inlet nozzle 280. In this regard, nozzle dam 400 comprises a generally cylindrical bracket 410 mounted on shoulder 295 defined by inside surface 300 of inlet nozzle 280. Bracket 410 has a circumferential outside surface 420 for matingly engaging the circumferential inside surface 300 of inlet nozzle 280. Bracket 410 may be permanently sealingly attached to inside surface 300, such as by one or more weldments 430 extending around bracket 410. Bracket 410 also has a plurality of transverse slots 425 therein in communication with each opening 440 for reasons disclosed hereinbelow. Bracket 410 also has a plurality of generally triangular or generally arcuate-shaped openings 440 therethrough sized to matingly receive means disposed in each opening 440 for sealingly plugging or closing each opening 440, the plugging means operable to engage slots 425 of bracket 410 for connecting the plugging means to bracket 410. In the preferred embodiment of the invention, the plugging means is a generally arcuate-shaped unitary plug, generally referred to as 450, matingly disposed in each opening 440 for sealably plugging each arcuate-shaped opening 440, plug 450 being operable to engage slots 425 of bracket 410 in the manner disclosed hereinbelow so that each plug 450 is connected to bracket 410.

Figure 7:
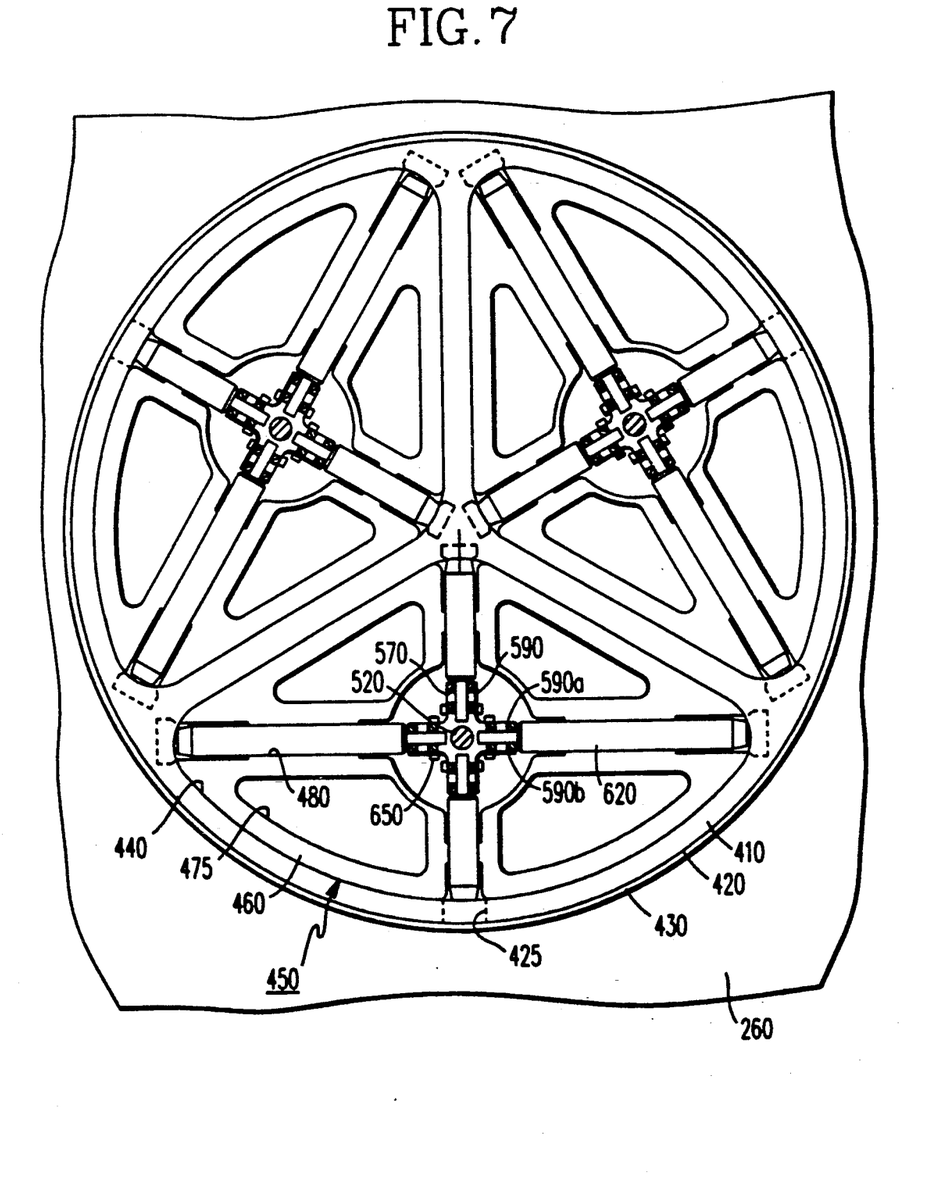
FIG. 7 is a view in partial horizontal section of the nozzle dam.
Figure 8:
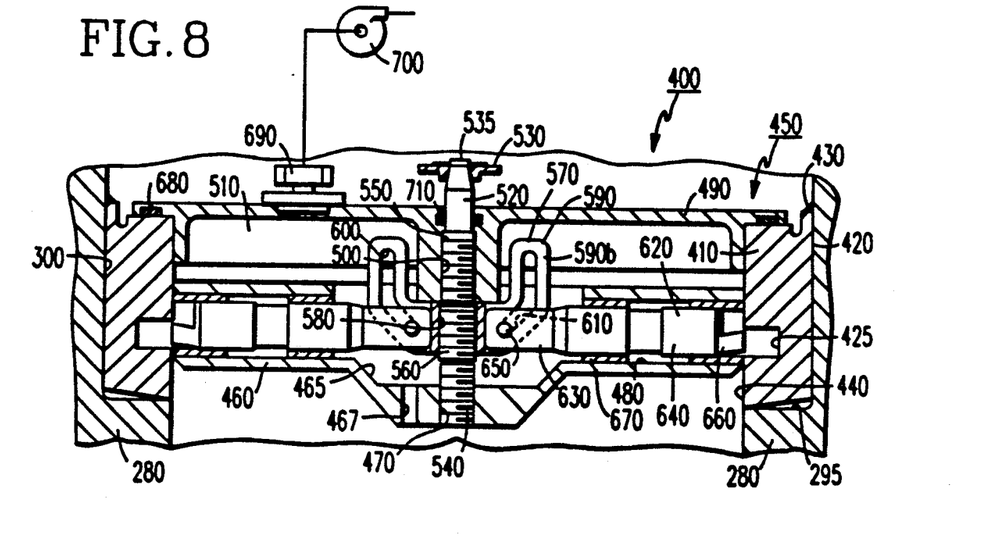
FIG. 8 is a view in vertical section of the nozzle dam showing a first plate, a second plate connected to the first plate and the bracket surrounding the first plate and the second plate.
Figure 9:
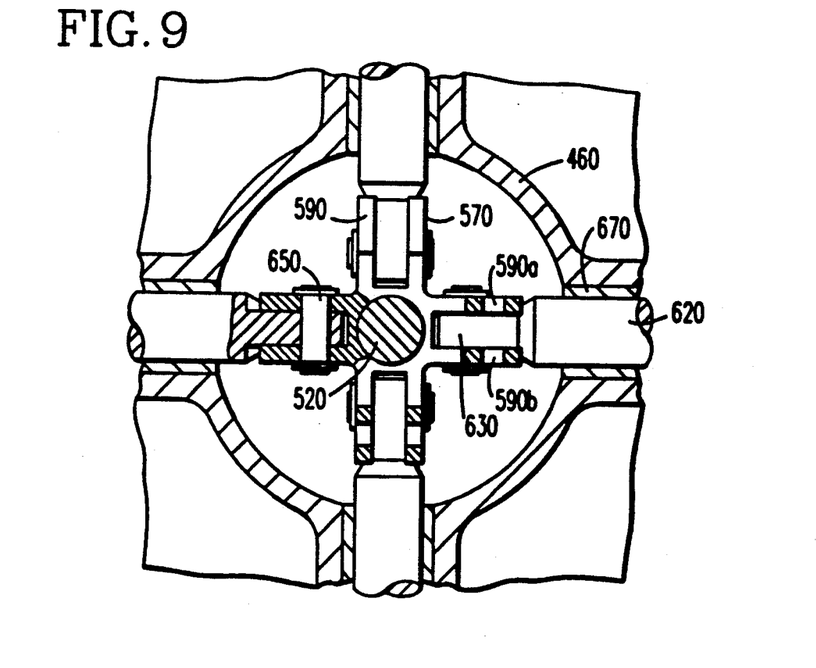
FIG. 9 is a fragmentation view taken in partial horizontal section of a portion of the nozzle dam.

As best seen in FIGS. 7, 8, and 9, each plug 450 comprises a generally triangular or generally arcuate-shaped first plate 460 matingly disposed in each opening 440. First plate 460 may define a cavity 465 therein and a drain hole 467 therethrough. Drain hole 467 allows fluid to enter and leave cavity 465. First plate 460 has a generally cylindrical threaded first bore 470 longitudinally therethrough for reasons disclosed more fully hereinbelow. First plate 460 may also have a plurality of longitudinal generally triangular or generally arcuate-shaped holes 475 therethrough for providing strength to first plate 460 while simultaneously decreasing the weight of first plate 460. Moreover, first plate 460 has a plurality of substantially smooth channels 480 formed transversely therethrough for reasons disclosed hereinbelow. Coaxially disposed adjacent first plate 460 and mounted atop bracket 410 (i.e., on the top surface of bracket 410) is a generally triangular or generally arcuate-shaped second plate 490 for sealingly matingly covering each opening 440. Second plate 490 has a generally cylindrical threaded second bore 500 longitudinally therethrough for reasons disclosed hereinbelow. First plate 460 and second plate 490 together may define a space 510 therebetween if plate 460 is disposed such that it is spaced apart from second plate 490.

Moreover, as seen in FIGS. 7, 8 and 9, threadably extending through threaded first bore 470 and threaded second bore 500 is an elongated rotatable threaded shaft 520 having a distal end and a proximal end. For purposes of the present description, the term "distal end" is defined to be that end of shaft 520 nearer tubesheet 230 and the term "proximal end" is defined to be that end of shaft 520 which is farther away from tubesheet 230. Shaft 520 also has a handle 530 attached, such as by a set screw 535, to its distal end for turning shaft 520. Threaded shaft 520 has a first threaded portion 540 near the proximal end of shaft 520 for threadably engaging first bore 470 and a second threaded portion 550 near the distal end of shaft 520 for threadably engaging second bore 500. The threads of first threaded portion 540 and the threads of second threaded portion 550 are oriented in the same direction but have a different pitch for reasons provided hereinbelow. That is, if the threads of first threaded portion 540 are "right-hand" threads of a predetermined pitch, then the threads of second threaded portion 550 are also "right-hand" threads but of a different predetermined pitch. Conversely, if the threads of first threaded portion 540 are "left-hand" threads of a predetermined pitch, then the threads of second threaded portion 550 are also "left-hand" threads but of a different predetermined pitch. It will be appreciated that as shaft 520 threadably engages first bore 470 and second bore 500, first plate 460 and second plate 490 are threadably connected thereby. Shaft 540 also has a third threaded portion 560 intermediate first threaded portion 540 and second threaded portion 550 for reasons disclosed hereinbelow. The threads of third threaded portion 560 are oppositely disposed to the direction of the threads of first threaded portion 540 and second threaded portion 550 for reasons disclosed more fully hereinbelow. That is, when the threads of first threaded portion 540 and second threaded portion 550 are "right-hand" threads, the threads of third threaded portion 560 are "left-hand" threads. Conversely, when the threads of first threaded portion 540 and second threaded portion 550 are "left-hand" threads, the threads of third threaded portion 560 are "right-hand" threads.

Still referring to FIGS. 7, 8, and 9, an actuator, such as a generally wing-shaped member or wing nut 570, is disposed on shaft 520 and threadably engages third threaded portion 560 of shaft 520. Wing nut 570 is thus interposed between first plate 460 and second plate 490 and coaxially aligned therewith. Wing nut 570 has a threaded bore 580 centrally longitudinally therethrough for threadably engaging third threaded portion 560 of shaft 520. Wing nut 570 also has a plurality of generally wing-shaped extensions or wings 590 integrally attached thereto and extending outwardly upwardly therefrom, each wing 590 having a generally arcuate transverse hole 600 of predetermined contour therethrough defining a cam surface 610. In the preferred embodiment, each wing nut 570 has four mutually perpendicular wings 590, each wing 590 having hole 600 therethrough defining the cam surface 610. Each wing 590 also defines a pair of integral parallel wing tines 590a and 590b having hole 660 therethrough for reasons disclosed more fully hereinbelow.

Referring yet again to FIGS. 7, 8 and 9, a generally cylindrical elongated arm 620 is slidably disposed in each substantially smooth channel 480. Thus, each arm 620 is oriented substantially perpendicularly with respect to its associated wing 590. Each arm 620 has a first end portion 630 adjacent wing 590 and a second end portion 640 adjacent bracket 410. First end portion 630 is sized to be interposed between wing tines 590a and 590b, so that first end portion 630 may be securely attached to wing 590. Integrally attached to first end portion 630 of arm 620 and transversely extending therethrough is a rounded cylindrical cam 650 for slidably engaging cam surface 610 of wing tines 590a and 590b. Thus, cam 650 laterally extends through hole 600 of each wing tine 590a and 590b. Integrally attached to second end portion 640 of arm 620 is an extended portion 660, which may be finger-shaped, for matingly engaging slot 425 of bracket 410, so that plug 450 is capable of being connected to bracket 410 as extended portion 660 engages slot 425. Moreover, matingly surrounding each arm 620 and interposed between first plate 460 and arm 620 may be a generally cylindrical wear-resistant sleeve or bushing 670 for providing a low-friction sliding surface, in order that arm 620 easily slides in bushing 670 with minimum friction. Integrally attached to second plate 490 and extending therearound is a fluid impermeable seal 680. Seal 680 is interposed between second plate 490 and bracket 410 for forming a seal therebetween so that opening 440 of bracket 410 is suitably sealed thereby. Seal 680 may be an elastomeric rubber of a type resistant to degradation caused by nuclear radiation, so that seal 680 will not lose its sealing ability when repeatedly disposed in the radiation environment of steam generator 80. For this purpose, seal 680 may be ethylene propylene diene monomer (EPDM). Thus, it will be appreciated that plates 460/490, shaft 520, actuator 570, arms 620, bushing 670 and seal 680 together substantially define the unitary plug 450.

Figure 10:
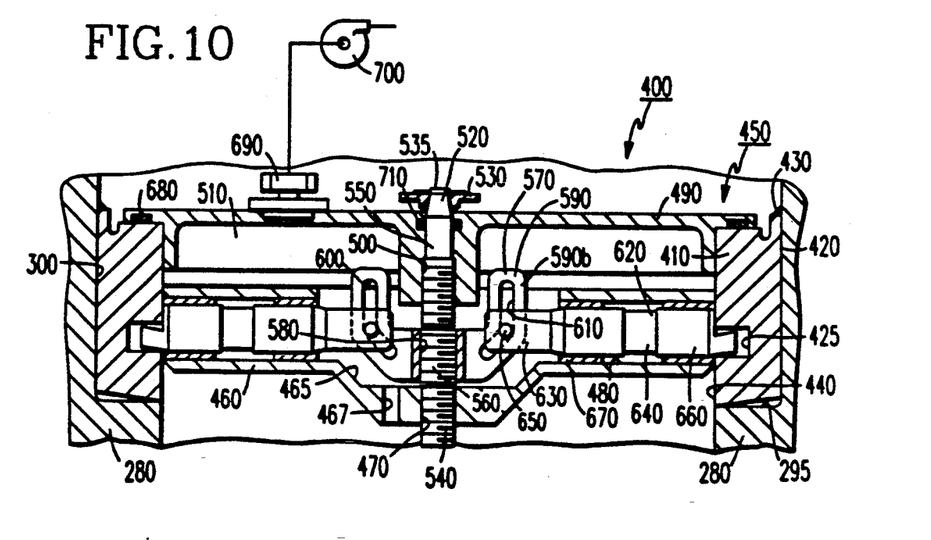
FIG. 10 is another view in vertical section of the nozzle dam after the first and second plates are connected to the bracket.

As illustrated in FIGS. 7, 8, and 10, attached to the exterior surface of second plate 490 may be a vent valve 690 in gas communication with opening 440 for venting entrapped radioactive gas (e.g., air) from opening 440 as the hydraulic head in upper cavity portion 52 forces the gas out of opening 440 when upper cavity portion 52 refills with water. It will be understood that when vent valve 690 is closed, opening 440 is sealed and when vent valve 690 is open, opening 440 is not sealed. It will be appreciated that vent valve 690 may be temporarily connected to a gas vacuum pump 700 for evacuating gas from opening 440. In addition, there may be a circular seal 710 disposed in second plate 490 and surrounding shaft 520 near the distal end thereof for providing increased sealing of opening 440.

As best seen in FIG. 10, plug 450 is there shown connected to bracket 410. In this regard, arms 620 are caused to slide in channel 480, in the operative manner disclosed hereinbelow, so that extended portion 660 slidably engages slot 425 to connect plug 450 to bracket 410.

Figure 10A:
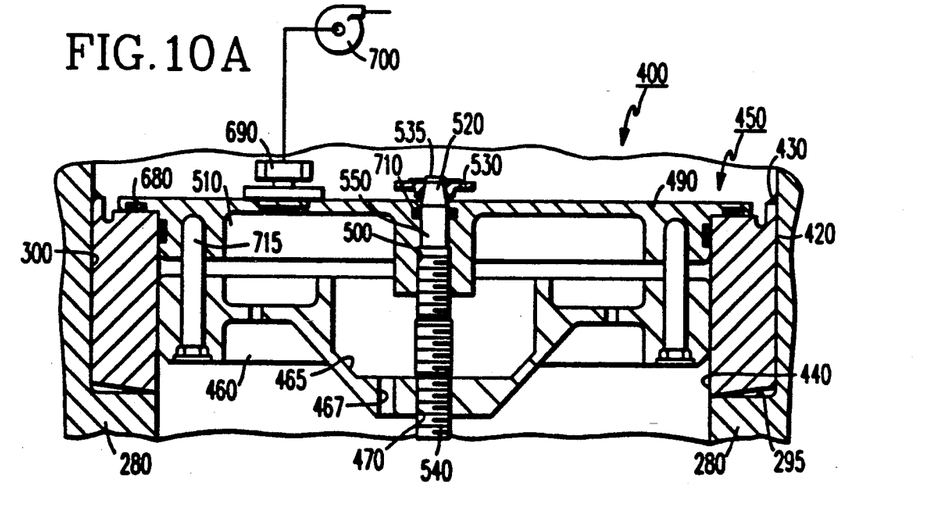
FIG. 10A is yet another view in vertical section of the nozzle dam showing a plurality of locking pins engaging the first and second plates.

FIG. 10A shows a plurality of elongated, generally cylindrical anti-rotation locating pins 715 engaging first plate 460 and second plate 490. Each locking pin 715 may be attached to first plate 460 and extend outwardly therefrom to matingly engage an associated bore formed in second plate 490. Locking pins 715 serve an important function. In this regard, locking pins 715 maintain the correct alignment of first plate 460 and second plate 490 so that first plate 460 will not rotate relative to second plate 490 (or vise versa) as shaft 520 is rotated. In this manner, extended portion 660 will remain aligned with slot 425 for easily slidably engaging extended portion 660 into slot 425.

Figure 11:
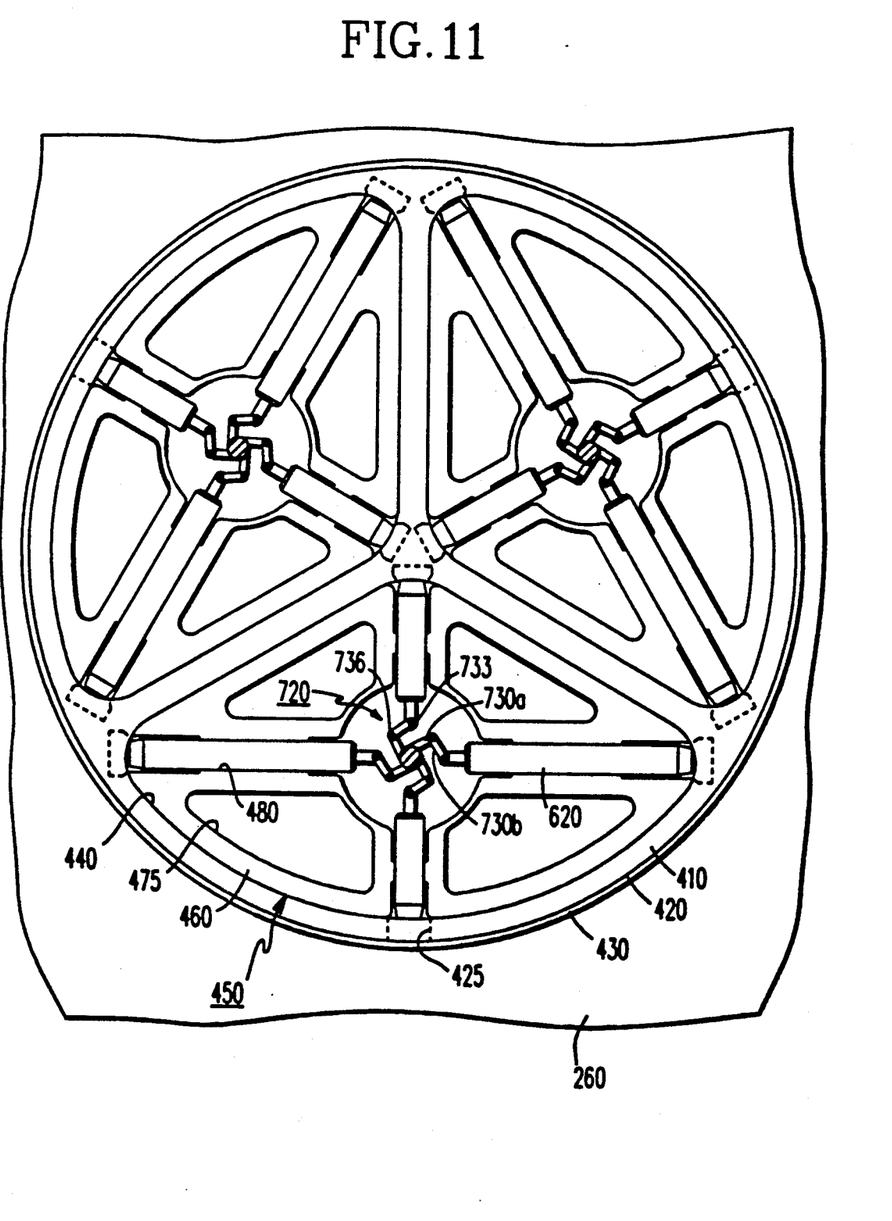
FIG. 11 is a view in partial horizontal section of an alternative embodiment of the nozzle dam.
Figure 12:
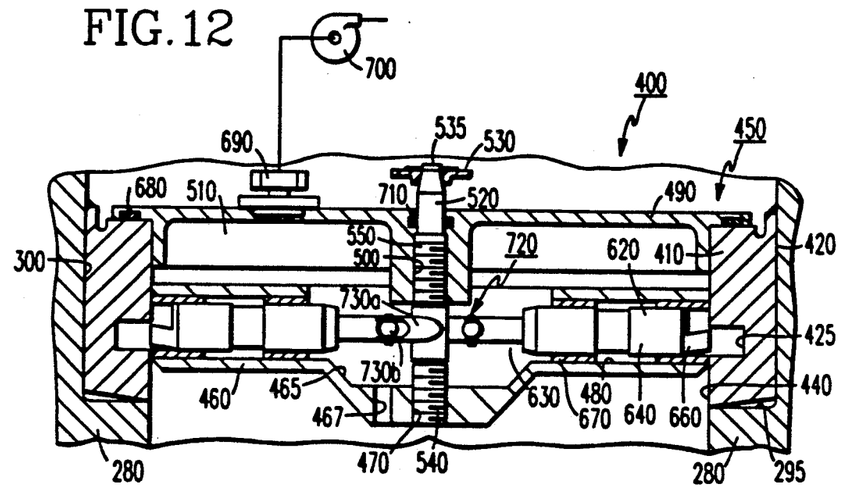
FIG. 12 is a view in vertical section of the alternative embodiment of the nozzle dam before the first and second plates are connected to the bracket.
Figure 13:
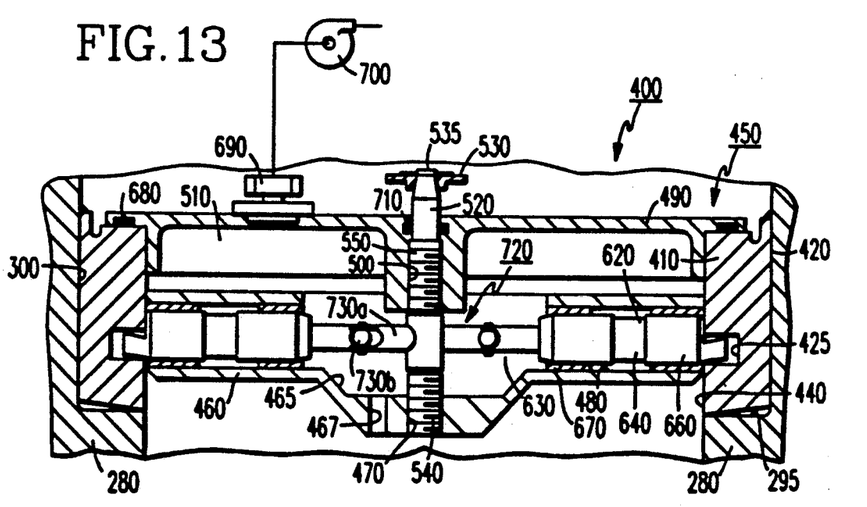
FIG. 13 is another view in vertical section of the alternative embodiment of the nozzle dam after the first and second plates are connected to the bracket.

Referring now to FIGS. 11, 12 and 13, there is shown an alternative embodiment of nozzle dam 400. The alternative embodiment of nozzle dam 400 is substantially similar to the preferred embodiment of nozzle dam 400 except that wing nut 570 is replaced by a link assembly or link mechanism, generally referred to as 720, interconnecting shaft 520 and arms 620. Link mechanism 720 comprises a plurality of generally cylindrical links, such as a first link 730a and a second link 730b, interconnecting shaft 520 and arm 620 for sliding arm 620 in channel 480. In this regard, first link 730a is attached at one end thereof to shaft 520 intermediate the distal end and the proximal end of shaft 520. The other end of first link 730a is pivotally connected by a first link pin 733 to one end of second link 730b. The other end of second link 730b is pivotally connected by a second link pin 736 to the first end portion 630 of arm 620. First link 730a and second link 730b define an angle of approximately 110° or greater therebetween for suitably moving arm 629 in channel 480 in the manner described immediately hereinbelow. As shaft 520 is rotated, each first link 730a will pivot about each first link pin 733 for pivoting second link 730b about second link pin 736 so that arm 629 slides in its associated channel 48 for engaging extended portion 660 into slot 425.

Figure 14:
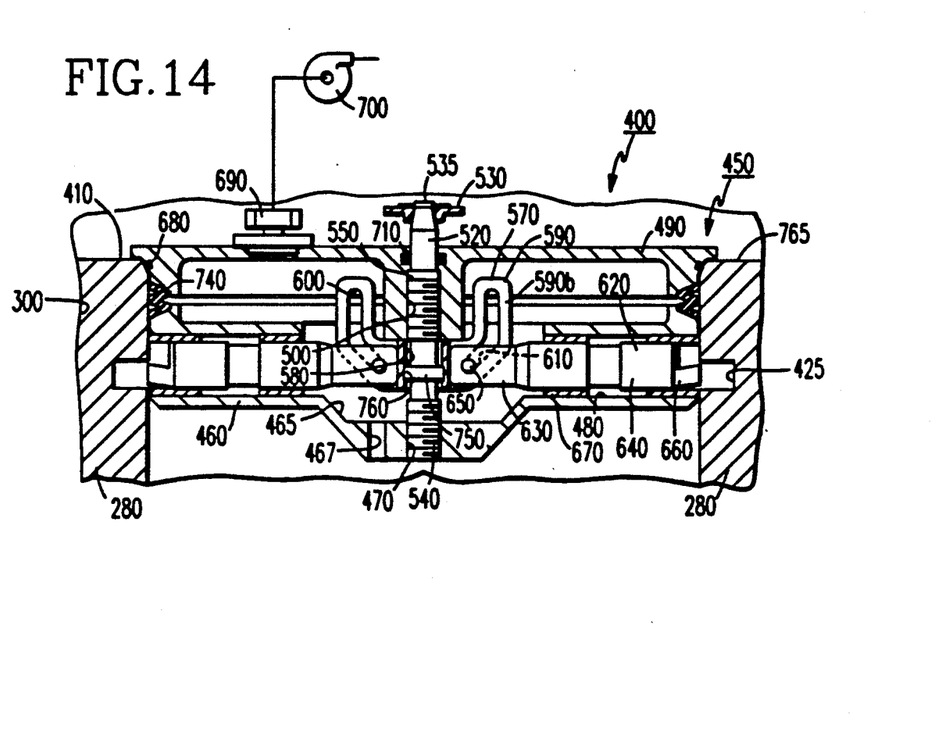
FIG. 14 is a view in vertical section of a second alternative embodiment of the nozzle dam before the first and second plates are connected to the nozzle rather than to the bracket.
Figure 15:
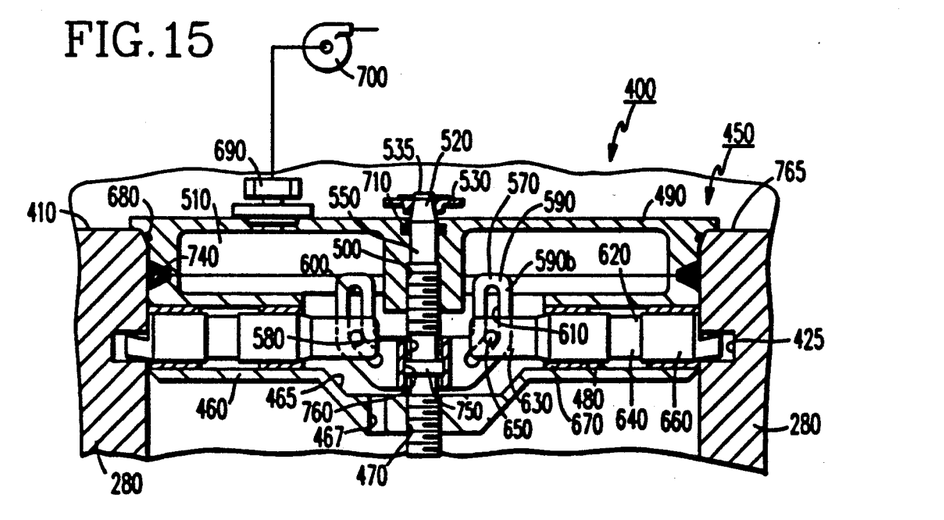
FIG. 15 is another view in vertical section of the second alternative embodiment of the nozzle dam after the first and second plates are connected to the nozzle rather than to the bracket.

FIGS. 14 and 15 show a second alternative embodiment of the invention. In this second alternative embodiment, a generally wedge-shaped seal 740 is interposed between first plate 460 and second plate 490 for providing sealing of inlet primary nozzle 280. As first plate 460 and second plate 490 are brought closer together, due to the rotation of shaft 520, wedge-shaped seal 740 will compress and sealingly engage bracket 410, as best seen in FIG. 15. Moreover, in this second alternative embodiment of the invention, third threaded portion 560 of shaft 520 is modified such that the threads of third threaded portion 560 on shaft 520 are no longer present. In this regard, an annular collar 750 integrally attached to shaft 520 is matingly received in a groove 760 formed in wing nut 570. Thus, wing nut 570 will translate downwardly (or upwardly) as shaft 520 threadably translates downwardly (or upwardly) through threaded bores 470 and 500 due to the engagement of collar 750 in groove 760.

OPERATION

Maintenance of steam generator 80 is preferably performed during refueling of reactor core 40. In this regard, reactor core 40 is shut down prior to refueling and closure head 30 is removed from atop lower portion 20 of reactor vessel 10 for providing access to reactor core 40. The elevation of refueling pool 70 is lowered to a level lower than inlet primary nozzle 280 and outlet primary nozzle 290. However, for safety reasons well known in the art, the elevation of refueling pool 70 is not lowered to a level that uncovers reactor core 40. After the elevation of refueling pool 70 is lowered to a level lower than nozzles 280 and 290, plugs 450 are installed in openings 440 of bracket 410 in the manner disclosed hereinbelow, which bracket 410 will have preferably been previously permanently disposed in inlet primary nozzle 280 and/or outlet nozzle 290. In this regard, bracket 410 will have been previously permanently attached to inside surface 300 by weldment 430, such as during manufacture of steam generator 80, so that bracket 410 abuts shoulder 295 of inlet primary nozzle 280, as best seen in FIGS. 8 and 10. Of course, it will be appreciated that shoulder 295 need not be present in inlet primary nozzle 280 in order to suitably dispose bracket 410 in inlet primary nozzle 280 because bracket 410 will be in any event welded to inlet primary nozzle 280.

A robotic device (not shown) is suitably connected to one of the plugs 450. The robotic device maneuvers plug 450 through manway opening 170 and into one of the openings 440 of bracket 410 for plugging opening 440. The robotic device can maneuver plug 450 through manway opening 170 because the widest outside dimension of plug 450 is less than the diameter of manway opening 170. By way of example only, for a typical nuclear steam generator the widest outside dimension of plug 450 may be approximately 14.0 inches and the diameter of manway opening 170 may be approximately 16.0 inches. Moreover, the diameter of the inlet or outlet primary nozzle may be approximately 26.0 inches to 32.0 inches. The robotic device inserts plug 450 into opening 440 until second plate 490 is mounted atop bracket 410 at which time extended portion 660 will be disposed adjacent slot 425. Disposing extended portion 660 adjacent slot 425 in this manner will result in extended portion 660 being aligned with slot 425.

The robotic device then will be operated to suitably rotate handle 530 so that shaft 520 rotates. Shaft 520 is rotated such that first threaded portion 540 of shaft 520 threadably engages threaded first bore 470 of first plate 460 and such that second threaded portion 550 of shaft 520 threadably engages threaded second bore 500 of second plate 490. Rotation of shaft 520 threadably advances shaft 520 in first bore 470 and second bore 500 for bringing first plate 460 and second plate 490 closer together because the threads of first bore 470 and second bore 500 have the same orientation (i.e., either "right hand" or "left hand" threads) and a different pitch. As shaft 520 thusly advances through first bore 470 and second bore 500, wing nut 570 will advance along third threaded portion 560 of shaft 520 because the threads of third threaded portion 560 and the threads of bore 580 (of wing nut 570) are oriented in a direction opposite the direction of the threads of first and second threaded portions 540 and 550. As wing nut 570 threadably translates or advances along third threaded portion 560, cam surface 610 will slidably engage cam 650 such that cam 650 will slide along and follow the contour of hole 600 which defines cam surface 610. As cam surface 610 slides along cam 650, arm 620 will slide in bushing 670 (disposed in channel 480) because cam 650 is attached to first end portion 630 of arm 620. As arm 620 slides in bushing 670, extended portion 660 of arm 620 will slidably engage slot 425 for connecting plug 450 to bracket 410 because extended portion 660 is aligned with slot 425. As shaft 520 is further rotated by rotating handle 530, second plate 490 will further bear against the exterior surface of bracket 410 for further compressing seal 680 into frictional engagement with bracket 410 so that opening 440 is suitably sealed thereby.

Radioactive gas (e.g., radioactive air) may be entrapped in opening 440 because a gas bubble forms anteriorly or proximally of nozzle dam 400 as upper cavity portion 52 and conduit 90 fills with water during the refueling operation. Therefore, after opening 440 is sealed, vent valve 690 is opened and vacuum pump 700, which is connected to vent valve 690, is operated to evacuate the radioactive gas from opening 440. It is desirable to evacuate opening 440 when any radioactive gas is present therein because evacuation of opening 440 reduces the risk that radioactive gas will be forced into inlet plenum chamber 260 during subsequent manned service operations of steam generator 80. In this regard, the water which displaces the gas in opening 440 also provides radiation shielding for service personnel who may be present in lower shell portion 160 during subsequent steam generator maintenance activities. Moreover, opening 440 will substantially refill with radioactive primary fluid during the refueling operation because refueling pool 70 will be refilled at that time and the elevation of refueling pool 70 will thus rise as it is refilled. That is, as the elevation of refueling pool 70 rises, the level of primary fluid in opening 440 will also rise because the hydraulic head in conduit 90 will increase, thereby increasing the risk that any gas trapped in opening 440 will seep past seal 680 and be forced into inlet plenum chamber 260. Hence, evacuating opening 440 of any gas present therein decreases the risk that such gas will seep past seal 680 and rise into inlet plenum chamber 260. Thus, vent valve 690 is opened to vent opening 400 of any radioactive gas that may be present in opening 400. After opening 400 is suitably evacuated of gas, vent valve 690 is sealingly closed. When vent valve 690 is closed, opening 440 is sealed so that maintenance can be performed in steam generator 80 during refueling of reactor core 40.

After reactor core 40 is refueled and after steam generator 80 is serviced, the elevation of refueling pool 70 is again lowered and each plug 450 is remotely removed from each opening 440 in substantially the reverse of its installation into each opening 440. However, before plugs 450 are removed from each associated opening 440, it may be necessary to again open vent valve 690 to permit air from inlet plenum 260 to vent into opening 440 for permitting easier removal of plugs 450. That is, the water in conduit 90 and opening 440 may cause a negative pressure gradient transversely across plugs 450 thereby inhibiting removal of plugs 450. After air is admitted into opening 440, plugs 450 are then removed from steam generator 80 through manway 170. In the preferred embodiment of the invention, bracket 410 which may have been previously permanently attached to inside surface 300 of inlet primary nozzle 280, such as during manufacture of steam generator 80, will remain in steam generator 80 after plugs 450 are removed from bracket 410 and steam generator 80. When steam generator 80 is returned to service, openings 440 of bracket 410 will allow the primary fluid to flow therethrough without substantially altering the flow path of the primary fluid flowing through inlet primary nozzle 280.

It will be appreciated that due to the unitary construction of each plug 450, it is not necessary to fold or to disassemble plug 450 in order to pass plug 450 through the relatively small diameter manway opening 170. Moreover, due to the unitary construction of plug 450, it is not necessary to dispose maintenance personnel in steam generator 80 to unfold or reassemble plug 450 in order to dispose plug 450 in inlet primary nozzle 280.

Although the invention is fully illustrated and described herein, it is not intended that the invention as illustrated and described be limited to the details shown, because various modifications may be obtained with respect to the invention without departing from the spirit of the invention or the scope of equivalents thereof. For example, openings 440 need not be arcuate-shaped; rather, openings 440 may be any suitable shape, such as circular. A further modification to the present invention would be to eliminate vent valve 690 and the associated vacuum pump 700, if venting gasses from opening 440 is not desired.

Moreover, although the invention was conceived during an investigation directed towards a nozzle dam having a unitary plug for sealing the primary nozzles of a nuclear steam generator, it will be appreciated that the invention may have other uses, such as sealing the interior of any similarly-shaped conduit.

Therefore, what is provided is a nozzle dam having a unitary plug for sealing the primary nozzles of a nuclear steam generator.

What is claimed is:

1. An apparatus for sealing a conduit having a circumferential inside surface, comprising:
   (a) a bracket having a circumferential outside surface for engaging the circumferential inside surface of the conduit, said bracket having an opening therethrough and a slot therein in communication with the opening; and
   (b) means disposed in the opening of said bracket for sealingly plugging the opening, said plugging means operable to engage the slot of said bracket for connecting said plugging means to said bracket, said plugging means including:
   (i) a first plate member disposed in the opening of said bracket, said first plate member having a threaded first bore and a channel therethrough;
   (ii) a second plate member mounted on said bracket and disposed coaxially adjacent said first plate member for sealably covering the opening of said bracket, said second plate member having a threaded second bore therethrough;
   (iii) a threaded shaft threadably engaging the threaded first bore of said first plate member and the threaded second bore of said second plate member for connecting said first plate member to said second plate member;
   (iv) an actuator connected to said shaft; said actuator having a cam surface thereon;
   (v) an arm connected to said actuator and slidably extending through the channel of said first plate member, said arm having an end portion sized to engage the slot of said bracket; and
   (vi) a cam attached to said arm for slidably engaging the cam surface of said actuator.

2. The apparatus according to claim 1, further comprising a seal interposed between said second plate member and said bracket for forming a seal therebetween.

3. The apparatus according to claim 2, wherein said first plate member comprises a bushing disposed in the channel of said first plate member, said bushing surrounding said arm for providing a low-friction sliding surface for said arm.

4. The apparatus according to claim 1, wherein said actuator is a link assembly.

5. The apparatus according to claim 1, further comprising anti-rotation means engaging said first plate member and said second plate member for maintaining said first plate member and said second plate member in relative alignment.

6. An apparatus for sealing a conduit having a circumferential inside surface, comprising:
   (a) a generally cylindrical bracket having a circumferential outside surface for matingly engaging the circumferential inside surface of the conduit and having a bearing surface thereon, said bracket having an opening longitudinally therethrough and a slot transversely therein in communication with the opening; and
   (b) a plug matingly disposed in the opening of said bracket for sealably plugging the opening, said plug operable to engage the slot of said bracket for connecting said plug to said bracket, whereby the opening is sealed as said plug sealingly plugs the opening and is connected to said bracket, said plug further including:
   (i) a first plate member disposed in the opening of said bracket, said first plate having a threaded generally cylindrical longitudinal first bore and a generally cylindrical transverse channel therethrough;
   (ii) a second plate mounted on the bearing surface of said bracket and coaxially disposed in the opening of said bracket and disposed adjacent said first plate for sealably covering the opening of said bracket, said second plate having a threaded generally cylindrical second bore longitudinally therethrough; and
   (iii) a generally cylindrical threaded shaft threadably engaging the threaded first bore of said first plate and the threaded second bore of said second plate for threadably connecting said first plate to said second plate;
   (iv) an actuator connected to said shaft, said actuator having a generally arcuate hole therethrough defining a cam surface; and
   (v) a generally cylindrical arm slidably extending through the channel of said first plate, said arm having a first end portion connected to said actuator and a second end portion sized to engage the slot of said bracket; and
   (vi) a rounded cam integrally attached to the first end portion of said arm for slidably matingly engaging the cam surface defined by the hole of said actuator, whereby the cam surface of said actuator slidably engages said cam as said actuator is actuated, whereby said arm slides in the channel as the cam surface slidably engages said cam, and whereby the second end portion of said arm engages the slot of said bracket as said arm slides in the channel.

7. The apparatus according to claim 6, further comprising a seal interposed between said second plate and said bracket for forming a seal therebetween.

8. The apparatus according to claim 7, further comprising a hollow generally cylindrical bushing disposed in the channel of said first plate, said bushing surrounding said arm for providing a low-friction wear surface so that said arm slides in said bushing with minimal friction.

9. An apparatus according to claim 8, further comprising a vent in communication with the opening defined by said bracket for venting gas from the opening, said vent being openable for venting the gas and closable for sealing the opening.

10. The apparatus according to claim 6, wherein said actuator is a link assembly, said link assembly having a portion thereof connected to said shaft and another portion thereof pivotally connected to said arm for sliding said arm in the channel of said first plate so that the second end portion of said arm engages the slot of said bracket.

11. The apparatus according to claim 6, further comprising an elongated anti-rotation pin extending outwardly from said first plate and engaging said second plate for maintaining said first plate and said second plate in relative alignment.

12. In a nuclear steam generator having a primary nozzle, an apparatus for sealing the primary nozzle, the primary nozzle having a circumferential inside surface, the inside surface defining a depending annular shoulder therearound, comprising:

(a) a generally cylindrical bracket mounted on the shoulder defined by the inside surface of the nozzle, said bracket having a circumferential outside surface for sealably matingly engaging the circumferential inside surface of the nozzle, said bracket having a plurality of generally arcuate openings longitudinally therethrough and a plurality of generally rectangular slots transversely therein in communication with each opening, said bracket having a bearing surface thereon; and (b) a unitary generally arcuate plug matingly disposed in each opening of said bracket for sealably plugging each opening, at least one of said plugs operable to engage the slots of said bracket for connecting said plug to said bracket, whereby the nozzle is sealed as each plug sealably plugs each opening and is connected to said bracket, each of said plugs including:

(i) a generally arcuate first plate disposed in each opening of said bracket, said first plate having a generally cylindrical threaded longitudinal first bore and a plurality of generally cylindrical transverse channels therethrough, said first plate having a plurality of generally arcuate holes longitudinally therethrough for maintaining the strength of said first plate while reducing the weight of said first plate;

(ii) a generally arcuate second plate mounted on the bearing surface of said bracket, said second plate disposed in the opening of said bracket and disposed coaxially adjacent said first plate, said second plate having a threaded generally cylindrical second bore longitudinally therethrough; and (iii) a rotatable generally cylindrical elongated threaded shaft having a proximal end and a distal end, said shaft having a first threaded portion near the proximal end thereof for threadably engaging the threaded first bore of said first plate and having a second threaded portion near the distal end thereof for threadably engaging the threaded second bore of said second plate so that said first plate is threadably connectable to said second plate, the first threaded portion and the second threaded portion having threads having a different pitch and disposed in the same direction, said shaft having a third threaded portion having threads disposed in a direction opposite the direction of the first and second threaded portions, the third threaded portion of said shaft disposed intermediate the first threaded portion and the second threaded portion, wherein at least one of the plugs includes:

(a) a wing nut having a threaded bore longitudinally therethrough threadably engaging the third threaded portion of said shaft, said wing nut having a generally arcuate hole transversely therethrough defining a cam surface; and (b) a generally cylindrical arm slidably disposed in each channel of said first plate, said arm having a first end portion for slidably engaging the cam surface of said wing nut and having a second end portion sized to matingly engage the slot of said bracket.

13. The apparatus according to claim 12, wherein said arm comprises a rounded cylindrical cam integrally attached to the first end portion of said arm for slidably matingly engaging the cam surface defined by the hole of said wing nut, (i) whereby said wing nut threadably traverses along the longitudinal axis of said shaft as said shaft is rotated;

(ii) whereby the cam surface of said wing nut slidably engages said cam as said wing nut traverses along the longitudinal axis of said shaft;

(iii) whereby said arm slides in the channel as the cam surface slidably engages said cam; and (iv) whereby the second end portion of said arm engages the slot of said bracket as said arm slides in the channel.

14. The apparatus according to claim 13, further comprising a fluid impermeable seal integrally attached to said second plate, said seal interposed between said second plate and said bracket for forming a seal therebetween, so that the opening of said bracket is sealed thereby.

15. The apparatus according to claim 14, wherein said seal is elastomeric rubber resistant to nuclear radiation.

16. The apparatus according to claim 14, further comprising a hollow generally cylindrical wear-resistant bushing disposed in the channel of said first plate, said bushing surrounding said arm for providing a low-friction wear-resistant surface so that said arm slides in said bushing with minimal friction.

17. The apparatus according to claim 16, further comprising a vent in communication with the opening defined by said bracket for venting radioactive gas from the opening, said vent being openable for venting the opening.

18. The apparatus according to claim 17, wherein said vent is a valve for venting the opening defined by said bracket as said valve is opened and for sealing the opening defined by said bracket as said valve is closed.

19. The apparatus according to claim 12, wherein at least one of said plugs further comprises:

(a) a first elongated link member having a first end portion connected to said shaft and having a second end portion;

(b) a second elongated link member having a first end portion pivotally connected to the second end portion of said first link member and having a second end portion pivotally connected to said arm for sliding said arm in the channel as said shaft is rotated.

20. The apparatus according to claim 12, further comprising a plurality of elongated generally cylindrical anti-rotation pins attached to said first plate and outwardly extending therefrom, said pins engaging said second plate for maintaining said first plate and second plate in relative alignment.

* * * * *